ns
3,415,882
PROCESS FOR PREPARING AZINES
Trevor Jenkins, Brian John Needham, and Michael Arthur Smith, Loughborough, England, assignors to Whiffen & Sons Limited, Loughborough, England
No Drawing. Filed Dec. 21, 1965, Ser. No. 515,481
Claims priority, application Great Britain, Dec. 22, 1964, 52,150/64
7 Claims. (Cl. 260—566)

ABSTRACT OF THE DISCLOSURE

Azines are prepared in high yield from ammonia and chlorine in the presence of a strong base and a carbonyl compound wherein the ratio of chlorine and strong base is between 1:1.5 and 1:4 and wherein the chlorine and the strong base are fed at the same time to the reaction. The process of this invention results in the formation of substantially no isohydrazone.

The present invention relates to a process for making azines which are useful as intermediates in the manufacture of hydrazine or its salts.

In the Raschig synthesis of hydrazine, hypochlorite is reacted with ammonia to form chloramine which is reacted with further ammonia to form hydrazine. It has been proposed to increase the yields obtained by this process by performing the process in the presence of a carbonyl compound which gives a hydrazone or azine from which hydrazine can be recovered. The use of hypochlorite, however, has various drawbacks. Thus for example, its use involves handling relatively large volumes of liquid and it tends to convert into chlorite and chlorate which are ineffective.

It has now been found that azines may be made in high yields from ammonia and chlorine, in the presence of a strong base and a carbonyl compound in a simple and economic way provided that the ratio of chlorine to strong base is maintained within certain limits.

The proportions of the chlorine and base are critical and, if there is insufficient base in relation to the quantity of chlorine, isohydrazones are formed as well as the azines. The relatively unstable isohydrazones are more difficult to isolate and to convert to hydrazine hydrate than the azines. On the other hand, if the base is present in too great an excess in relation to the quantity of chlorine, the chloramine formed in the process is decomposed.

Accordingly the present invention provides a process for preparing azines which comprises reacting gaseous chlorine with aqueous ammonia in the presence of a carbonyl compound and a strong base, wherein the chlorine and strong base are fed at the same time to the reaction in a mole ratio of between 1:1.5 and 1:4.

Suitably in the process of the present invention 2 to 3 moles of strong base are fed to the reaction along with every mole of chlorine fed to the reaction. Preferably about 2 moles of strong base are fed to the reaction along with every mole of chlorine fed to the reaction.

One way of controlling the mole ratio of chlorine to strong base is to maintain the pH of the reaction solution at an appropriate level. For instance when controlling the mole ratio of chlorine to strong base at 1:2 the pH should be between 12.8 and 13.0 at 30°–40° C.

For high yields of azine it is necessary to use an excess of ammonia in relation to chlorine. Suitably the mole ratio of ammonia to chlorine is in the range 10:1 to 50:1, preferably it is in the range 20:1 to 40:1.

The carbonyl compound which is used in the present invention may be a ketone or an aldehyde of the formula:

wherein $R^1$ is hydrogen; alkyl, preferably containing 1 to 4 carbon atoms such as methyl, ethyl, propyl or butyl; $R^2$ is alkyl, preferably containing 1 to 4 carbon atoms such as for example methyl, ethyl, propyl or butyl; or aryl such as for example phenyl or wherein $R^1$ and $R^2$ together with the carbon atom of the carbonyl group form a cycloalkyl ring. Examples of suitable carbonyl compounds are acetaldehyde, propionaldehyde, methylisobutyl ketone, diethyl ketone, benzaldehyde and cyclohexanone. Preferably the carbonyl compound is acetone or methyl ethyl ketone.

Preferably 2 to 6 moles of carbonyl compound are used per mole of chlorine.

As the base it is preferred to use an alkali metal hydroxide such as potassium hydroxide or sodium hydroxide. Other bases such as calcium hydroxide, tetramethylammonium hydroxide, and the like may be used. It will generally be most suitable to use sodium hydroxide.

The process of the present invention may be operated at atmospheric pressure or elevated pressures. If superatmospheric pressures are used the pressure is preferably not more than 20 atmospheres above atmospheric pressure.

The temperature at which the present process is operated is not critical and any temperature up to the boiling point of the carbonyl compound may be used. It is usually most convenient to operate the process at a temperature in the range 20 to 40° C.

The reaction may be performed continuously or batchwise. If it is performed continuously the reaction may take place in either a tank reactor or a tube reactor.

An agent such as gelatin or ethylenediaminetetra-acetic acid may be used in the process to sequester any ions which interfere with the reaction, although this is not essential. If desired the chlorine can be diluted with an inert gas such as nitrogen for instance with 1 to 4 moles of nitrogen for every mole of chlorine, but this is not necessary, as even with undiluted chlorine the reaction is not vigorous.

The azine which is formed by the process of the present invention may be readily converted into hydrazine, hydrazine hydrate or hydrazine salts by hydrolysis. Thus the azines can be readily converted to hydrazine salts by treatment with an acid such as hydrochloric acid or sulphuric acid or many be converted directly to hydrazine hydrate for example by distillation, suitably under pressure. The invention consequently provides a very effective and economic method of making hydrazine since the other product of the hydrolysis is the carbonyl compound which can be recycled to the process.

The following examples are given to illustrate the process of the present invention.

Example 1

0.2 mole of chlorine per hour, diluted with 0.8 mole of nitrogen per hour was passed for one hour into a stirred solution containing 0.6 mole of methyl ethyl ketone, 6 moles of ammonia, one millilitre of a 1% solution of gelatin and 400 millilitres of water. 0.4 mole of sodium hydroxide as a 50% solution in water was added uniformly throughout the addition of the chlorine at a mole ratio of 2:1. The temperature during the reaction was 35° C.

At the end of the reaction the yield of azine as 98% and the amount of isohydrazone formed was negligible.

Example 2

0.2 mole of chlorine per hour diluted with 0.8 mole of nitrogen per hour was passed for one hour into a stirred solution containing 0.6 mole of acetone, 6 moles of ammonia, one millilitre of a 1% solution of gelatin and 400 millilitres of water. Sodium hydroxide as a 50% solution in water was added to the reaction mixture to maintain the pH of the mixture at a value of 12.8. The temperature during the reaction was 30° C.

At the end of the reaction the yield of azine was 97% and practically no isohydrazone was formed.

Example 3

The conditions and proportions as specified in Example 2 were repeated except that this time the sodium hydroxide was added so as to maintain the pH of the reaction mixture of 13.5. This corresponded to a chlorine, sodium hydroxide ratio of 1:2.5.

The yield of azine was 90% and no isohydrazone was formed.

Example 4

The conditions and proportions specified in Example 2 were repeated except that this time the sodium hydroxide was added so as to maintain the pH of the reaction mixture at 12.5 which corresponds to a chlorine, sodium hydroxide ratio of 1:1.8.

The yield of azine was 88% and the yield of isohydrazone was 8%.

Example 5

0.2 mole of chlorine per hour, diluted with 0.6 mole of nitrogen per hour, was passed for one hour into a solution containing 0.8 mole of acetone, 5 moles of ammonia, one millilitre of a 2% solution of ethylenediamine tetraacetic acid and 350 millilitres of water. 0.4 mole of potassium hydroxide as a 50% solution in water was added uniformly throughout the addition of the chlorine, this corresponding to a chlorine, potassium hydroxide ratio of 1:2. The temperature was maintained at 30° C.

At the end of the reaction the yield of azine was 95% and practically no isohydrazone was formed.

Example 6

0.2 mole per hour was passed for one hour into a solution containing 0.4 mole of diethyl ketone, 5 moles of ammonia and 300 millilitres of water. 0.4 mole of sodium hydroxide as a 50% solution in water was added uniformly throughout the addition of chlorine, this corresponding to a chlorine, sodium hydroxide ratio of 1:2. The temperature was maintained at 40° C.

At the end of the reaction the yield of azine was 90%.

Comparative experiments

The conditions and proportions specified in Example 1 were repeated except that the mole ratio of chlorine to caustic soda was maintained at 1:1 in one instance and at 1:4.5 in another instance. In both cases the yield of azine was down to 50% and in the first case a 47% yield of isohydrazone was obtained.

We claim:

1. A process for preparing azines which comprises reacting gaseous chlorine with aqueous ammonia in the presence of a carbonyl compound and a strong base wherein the chlorine and strong base are fed at the same time to the reaction in a mole ratio of between 1:1.5 and 1:4; said carbonyl compound having the formula

wherein $R^1$ is selected from the group consisting of hydrogen and 1–4 carbon alkyl groups; $R^2$ is a 1–4 carbon alkyl group; and $R^1$ and $R^2$ taken together comprise a 4–6 carbon cycloalkyl ring.

2. A process as claimed in claim 1 wherein the chlorine and strong base are fed to the reaction at the same time in the ratio of 2 to 3 moles of strong base for every mole of chlorine.

3. A process for preparing azines which comprises reacting gaseous chlorine with aqueous ammonia in the presence of a strong base and a carbonyl compound wherein (1) the chlorine and strong base are fed at the same time to the reaction in a ratio of 2 to 3 moles of strong base for every mole of chlorine (2) the mole ratio of ammonia to chlorine is in the range 10:1 to 50:1 and (3) the mole ratio of carbonyl compound to chlorine is in the range 2:1 to 6:1 and wherein the carbonyl compound has the formula

wherein $R^1$ is selected from the group consisting of hydrogen and 1–4 carbon alkyl groups and $R^2$ is a 1–4 carbon alkyl group and $R^1$ and $R^2$ taken together comprise a 4–6 carbon cycloalkyl ring.

4. A process for preparing azines which comprises reacting gaseous chlorine with aqueous ammonia in the presence of a strong base and a carbonyl compound wherein (1) the chlorine and strong base are fed at the same time to the reaction in a ratio of 2 to 3 moles of strong base for every mole of chlorine, (2) the mole ratio of ammonia to chlorine is in the range 20:1 to 40:1 and (3) the mole ratio of carbonyl compound to chlorine is in the range 2:1 to 6:1 and wherein the carbonyl compound is selected from the group consisting of acetone and methyl ethyl ketone.

5. A process for preparing azines which comprises reacting gaseous chlorine with aqueous ammonia in the presence of sodium hydroxide and a carbonyl compound selected from the group consisting of acetone and methyl ethyl ketone wherein (1) the chlorine and sodium hydroxide are fed at the same time to the reaction in a ratio of about 2 moles of sodium hydroxide for every mole of chlorine, (2) the mole ratio of ammonia to chlorine is in the range 20:1 to 40:1 and (3) the mole ratio of carbonyl compound to chlorine is in the range 2:1 to 6:1.

6. A process for preparing azines which comprises reacting gaseous chlorine with aqueous ammonia in the presence of sodium hydroxide and a carbonyl compound at a temperature in the range 20° C. to 40° C., wherein (1) the chlorine is diluted with gaseous nitrogen (2) the chlorine/nitrogen mixture and sodium hydroxide are fed at the same time to the reaction mixture in a ratio of about 2 moles of sodium hydroxide for every mole of chlorine (3) the mole ratio of ammonia to chlorine is in the range 20:1 to 40:1 and (4) the mole ratio of carbonyl compound to chlorine is in the range 2:1 to 6:1 said carbonyl compound having the formula

wherein $R^1$ is selected from the group consisting of hydrogen and 1–4 carbon alkyl groups; $R^2$ is a 1–4 carbon alkyl group; and $R^1$ and $R^2$ taken together comprise a 4–6 carbon cycloalkyl ring.

7. A process as claimed in claim 6 wherein the reaction is carried out in the presence of an agent selected from the group consisting of gelatin and ethylenediamine tetraacetic acid.

(References on following page)

References Cited

UNITED STATES PATENTS 2,894,032  7/1959  Rudner _____ 260—566

OTHER REFERENCES

Paulsen et al.: Ber. Deut. Chem., vol. 94, pp. 968 to 975 (1961) QD1.D4.

Tarugi et al.: Chem. Abstr., vol. 6, p. 2912 (1912) QD1.A51.

FLOYD D. HIGEL, *Primary Examiner.*

U.S. Cl. X.R.

260—239; 23—190, 87, 117